United States Patent [19]

Kasner

[11] Patent Number: 4,772,122
[45] Date of Patent: Sep. 20, 1988

[54] ALIGNMENT TECHNIQUE FOR LASER BEAM OPTICS

[75] Inventor: William H. Kasner, Penn Hills, Pa.

[73] Assignee: Westinghouse Electric Corp., Pittsburgh, Pa.

[21] Appl. No.: 897,478

[22] Filed: Aug. 18, 1986

[51] Int. Cl.[4] .................. G01B 11/26; G01C 1/00
[52] U.S. Cl. ................................. 356/152; 356/153; 219/121.78; 219/121.79; 219/121.81; 219/121.8
[58] Field of Search ............. 356/152, 153, 138; 219/121 LU, 121 LV, 121 LX, 121 LW

[56] References Cited

U.S. PATENT DOCUMENTS

| | | | |
|---|---|---|---|
| 3,494,699 | 2/1970 | Gloge | 356/152 |
| 3,504,979 | 4/1970 | Stephany . | |
| 3,535,525 | 10/1970 | Minkowitz . | |
| 3,551,057 | 12/1970 | Hamilton et al. . | |
| 3,778,169 | 12/1973 | Adams . | |
| 3,790,276 | 2/1974 | Cook et al. | 356/152 |
| 3,892,488 | 7/1975 | Edmonds . | |
| 3,942,894 | 3/1976 | Maier | 356/153 |
| 3,989,385 | 11/1976 | Dill et al. | 356/152 |
| 4,012,148 | 3/1977 | Marantette et al. . | |
| 4,105,339 | 8/1978 | Wirtanen | 356/152 |
| 4,146,329 | 3/1979 | King et al. . | |
| 4,326,800 | 4/1982 | Fitts | 356/153 |
| 4,391,519 | 7/1983 | Kuwabara et al. | 219/121 LU |
| 4,466,739 | 8/1984 | Kasner et al. . | |
| 4,499,897 | 2/1985 | Roussel | 219/121 LU |
| 4,574,180 | 3/1986 | Kasner et al. . | |
| 4,618,759 | 10/1986 | Muller et al. | 219/121 LV |

OTHER PUBLICATIONS

U.S. appln. Ser. No. 821,673, filed 01/23/86, entitled "Laser Beam Alignment and Transport System", by Phillip Hankins et al.

*Primary Examiner*—Stephen C. Buczinski

[57] ABSTRACT

A method and apparatus for aligning laser cavity and transport optics with one or more targets is disclosed. An alignment beam is deflected from its initial path and is rotated about the alignment axis in an annular sweep. Detectors circumferentially located about a desired point located relative to the target are responsive to the intensity of the rotatig alignment beam for producing corresponding outputs. The cavity optics and transport optics may be adjusted relative to the target so that the output of the detectors are the same thereby assuring that the various respective optics are aligned with the target.

31 Claims, 11 Drawing Sheets

ALIGNMENT TECHNIQUE FOR LASER BEAM OPTICS

GOVERNMENT CONTRACT

The invention described herein was made in the course of or under a contract with the U.S. Department of Defense.

BACKGROUND OF THE INVENTION

1. Field of the Invention

The invention is directed to a technique for aligning laser beam optics including transport system optics and laser cavity optics.

2. Description of the Prior Art (a) Laser Transport System Optics

In the use of lasers it is frequently necessary to transport the laser beams over large distances and use several mirrors to deflect the beam around obstacles, through wall openings and ultimately focus the laser beam on a work piece. Such beam transport systems are frequently encountered in high power laser systems where several work stations may be used. In the alignment of such beam transport systems, it is common practice to use a visible alignment laser beam, such as that emitted by a HeNe laser, as a tracking beam for visual alignment of the system. This is especialy important in certain applications for two reasons. First, the laser beams of some laser systems, notably $CO_2$ lasers, YAG lasers and excimer lasers, are not visible and their propagation through a complex optical system cannot be easily observed. Second, these lasers frequently operate at such power levels that it is unsafe to turn them on without being sure where the beams will impact. An example of how an alignment laser system can be used to align a high power laser optical system can be explained with the use of FIG. 1. This technique combines elements of common practice and some procedures disclosed in U.S. Pat. No. 4,466,739.

In order to simplify the following descriptions, reference to mirrors, targets and detectors will sometimes be made alone (e.g., Mo, M', M", T1, T2 . . . , Da, Db . . . , etc.) without referring to function (e.g., observation mirror, transparent mirror, etc.). Also, unless necessary for directional orientation, numbered or lettered designations of mirrors or detectors, etc. will not be used.

Prior to aligning the optical system the alignment laser 10 (sometimes referred to as HeNe laser) must be adjusted so that its visible beam B, illustrated by the long/short dashed line, tracks the path followed by the beam P of a high power laser (not shown), illustrated in solid lines of a high power laser (not shown). In FIG. 1, apertured observation mirror Mo directs the image to a viewing system (shown schematically as an eye E) for observation of reflected signals from the optical system. The alignment beam passes through hole H in Mo and is reflected from the surface of first deflecting mirror M'. (The mounting of M' is fabricated so that the mirror can be lifted out of position and replaced again and maintain the original orientation.) The alignment laser beam B is then reflected off the second deflecting mirror M" which is temporarily located in the position shown between first deflecting mirror M' and all downstream laser transport mirrors M1–M5. To co-align the alignment beam B with the high power laser beam P, one first removes M' and directs the high power laser beam P against the second deflecting mirror M" along the straight auxiliary path AUX (dotted lines) where it impacts targets that can be located at different points along the path. The high power laser (not shown) is turned off and M' is reinserted, thereby causing the alignment laser beam B to traverse the auxiliary path AUX. The orientation of the alignment laser 10 is then adjusted until its beam B strikes the centers of movable targets previously irradiated with the high power laser beam P. When this condition is achieved, the alignment laser beam B reflected from M' is co-linear with the center of the high power laser beam P, and mirror M" can be removed.

In aligning the optical system exemplified in FIG. 1, the high power laser beam P is turned off and the mirror M' is kinematically located in position. With the alignment laser 10 turned on, the transport mirror M1 is positioned so that the beam B strikes its center section. The target T2, indicated in dashed lines, is then inserted into the beam path in front of mirror M2. This target T2 should be made of a material that will scatter the beam B. This scattered radiation can be observed by looking directly at T2. Alternately, a part of the radiation will scatter back through the optical system, i.e., reflect off M1, M', and Mo and into viewing system E. The mirror M1 is then adjusted until the beam B strikes T2 at a previously determined position that corresponds to striking mirror M2 at the center position. The target T2 is then removed, either mechanically or by hand (see the double headed arrow), and target T3 is positioned in place in front of M3. The mirror M2 is adjusted until the beam B strikes the proper spot on T3. This procedure is repeated for all transport mirrors, M1–M5, etc., until the beam B is finally projected onto the focal spot F where the high power laser beam P will ultimately be focused for the proposed application. At this point the preliminary alignment of the laser beam transport system is completed. The final check of the alignment is made by removing the first deflecting mirror M' and turning on the high power laser (not shown).

To use this alignment technique, it is necessary to insert targets T2, T3 . . . into the optical path and observe where the beam B impacts each target. As noted, the insertion of the targets can be done either mechanically or by hand. In the former case, one must have a mechanical means to accurately position each target at its proper location and then be able to remove it and, as necessary, replace it again accurately time after time. In the latter case, one must have access to all mirror locations to position the targets. Also, with this alignment technique, one must observe where the beam B strikes each target either directly or by some remote method such as described above. (Alternately, techniques involving video monitors or quadrant detectors could also be used to monitor the positions where the HeNe laser beam strikes the targets). In any event, such systems are complex and sometimes difficult to implement efficiently.

(b) Laser Cavity Allignment

It is customary to use unstable resonator cavity optics in high power pulsed/CW laser systems. Such laser optics 12, shown schematically in FIG. 9, tend to extract the most energy from the gain medium and, in addition, produce beams that progagate well. The unstable resonator laser cavity optics usually consist of a concave mirror M2C and a smaller convex mirror, M1C located on the axis A—A' of laser gain medium G. The laser beam P emitted by such a system (shown in dotted lines) has an annular cross-section. Sometimes the mirror M1C is located off the center position. In this case the cross-section of the laser beam is "U" shaped or "L" shaped.

The conventional alignment of unstable resonator laser cavity optics, while quite simple in principle, frequently proves to be a challenge because it requires an invasion of the laser cavity or the laser optical system. In large high-power lasers it is not always simple, or in fact possible, to locate optical components within the laser cavity.

Two general techniques have been used to align unstable resonator laser cavity optics. The most straight forward technique for alignment is shown schematically in FIG. 10. An auxiliary optical system consisting of alignment laser 10 (e.g. a HeNe laser), a thin semi-transparent pellicle SP, and a small flat mirror M' are located in the laser cavity (shown with gain medium removed). The mirror M' is oriented so that the alignment laser beam B (arrows) striking it is reflected back along the same path. The thin pellicle SP, normally 50% transmitting and 50% reflecting, located in the path X—X' of the alignment laser 10 reflects the alignment laser beam along the desired optical path A—A' of the unstable resonator laser cavity. Once this auxiliary optical system has been installed and adjusted, the alignment of the cavity mirrors M1C and M2C consists simply of adjusting their elevation and azimuth controls until the auxiliary laser beams striking their surfaces are reflected back on themselves. (It has been assumed that M1C and M2C have been physically positioned so that their centers are aligned on the A—A' axis). Once the mirrors M1C and M2C are aligned, the auxiliary optical components must either be removed or positioned out of the way so that they don't interfere with the operation of the laser. The latter option is not always possible.

A second technique for aligning unstable laser cavity optics that does not require the positioning of optical components within the cavity is shown in FIG. 11. In this case a target T is set up perpendicular to the cavity axis A—A' a short distance from M1C. An alignment laser beam B is projected through a small hole h in the target T. This alignment laser beam B, which is oriented parallel to the axis A—A', passes near the edge of M1C and is initially reflected from M2C. The alignment laser beam then reflects many times from the surfaces of M1C and M2C and finally strikes the target T as shown by the dark annular pattern Pa. Diffraction and multiple reflections from M1C and M2C cause the alignment laser beam B to spread over the large area shown. The alignment of M1C and M2C to the axis A—A' is achieved by adjusting their elevation and azimuth controls to achieve a symmetrical and uniform pattern Pa of the alignment laser beam B on the target T. It is necessary to adjust both mirrors M1C and M2C together to achieve this alignment. After the system is aligned, the alignment laser and target must be removed to permit normal operation of the laser system.

The techniques for aligning unstable resonator laser cavity optics described above are typical of the alignment methods now being used. They require an "invasion" of the laser cavity and/or laser optical system and rely on visual observation of the alignment laser beams. These constraints are often undesirable.

SUMMARY OF THE INVENTION

There has been provided a method and apparatus for aligning the axis of a main laser with a target by aligning an alignment laser beam relative to the main laser axis using a selected portion of the laser cavity or transport system optics to carry the alignment laser beam, rotating the alignment beam about a desired alignment point, sensing the annular sweep thereabout and adjusting the selected cavity or transport system optics until the intensity of the annular sweep is centered relative to the alignment point.

The apparatus includes means for locating the alignment laser axis relative to the main laser axis, means for deflecting and rotating the alignment beam about a point in an annular sweep, means located relative to the target for sensing the intensity of the annular sweep of the alignment beam and means for adjusting the position of laser cavity or transport optics to align their respective centers with the center of the annular sweep. The alignment beam may include a separate source or a portion of the main beam.

The invention uses insitu, non-moving targets, located outside the beam path normally occupied by the high power laser, to monitor the alignment laser position. In one embodiment, the target detectors are electronic, i.e., photodetectors, and do not require visual observation. In this arrangement, alignment lasers may radiate outside the visible spectrum. Single and multiple element detectors may be used. A portion of the radiation from the high power laser may be used for self-alignment of the system.

The proposed alignment techniques are compatible with computer control and automatic alignment is feasible.

DESCRIPTION OF THE INVENTION

Section I: Transport Optics Alignment

To explain the operation of the alignment system of the present invention, it is first necessary to explain the technique for operating an exemplary HeNe alignment laser. It will then be shown how this alignment laser, when modified in accordance with the present invention, can be used for optical system alignment.

Figure 2:
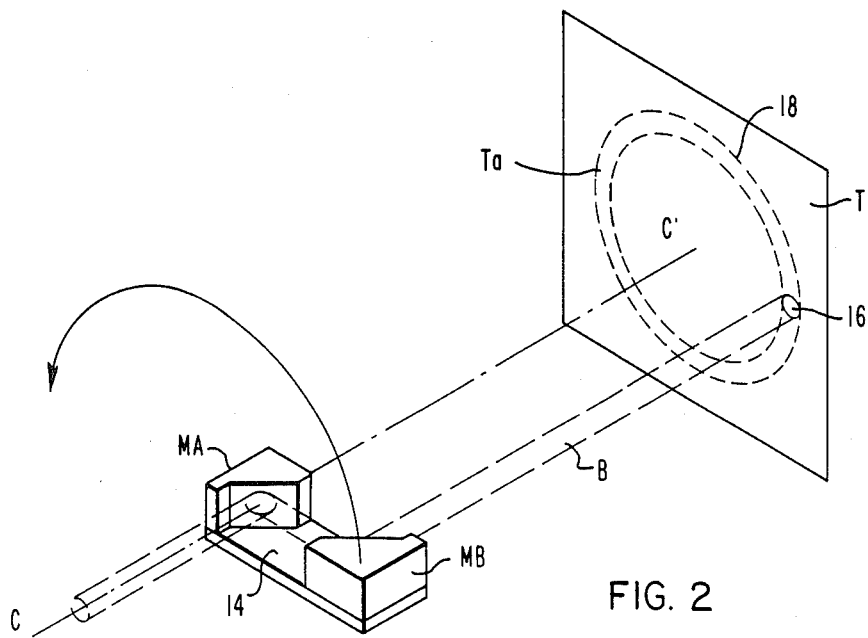
FIG. 2 is a simplified representation of an embodiment of the present invention illustrating off axis deflection of the alignment beam.

FIG. 2 shows a simple embodiment of how it is proposed to modify the performance of the alignment laser. The line C—C' represents the normal path of the alignment laser. Following the procedures described in the prior art, this path is made to coincide with the high power laser beam path. A rotatable mirror assembly 14 including mirrors MA and MB is inserted into the path C—C' and the alignment laser beam B (shown as a cylindrical trace) is reflected from both mirrors, MA and MB, and follows the offset path indicated forming circular spot 16 in target T. For the purpose of this discussion, the two mirrors are initially oriented so that their surfaces are parallel to each other and are set at an angle of 45° with respect to the line C—C'. (It is not critical that this angle be 45°, other angles being equally acceptable.) Under this condition, the segment of the alignment laser beam B reflected from MA and MB is parallel to C—C' but displaced from it.

The mirror assembly 14 is caused to rotate about the initial alignment laser path C—C' as indicated in FIG. 2. As the assembly 14 rotates, the spot 16 produced by the alignment laser (not shown) on the target T follows a circular path as indicated by the dashed lines 18. If the rotation rate of the assembly 14 is sufficiently high, i.e., greater than about 15-20 Hz, the visual alignment laser image on the target T is an annular ring or trace Ta. This annular ring image pattern may then be used for alignment of a high power laser optical system following the conventional procedures outlined in the previous section. (In FIG. 2 and all subsequent figures of alignment systems, the kinematically mounted mirror M', is omitted. See FIG. 1, for details of how M' is used to render the alignment laser beam B coincident with the high power laser beam P. Here in FIG. 2 the beams are simply shown in a straight line as though they were coincident.)

Figure 3:
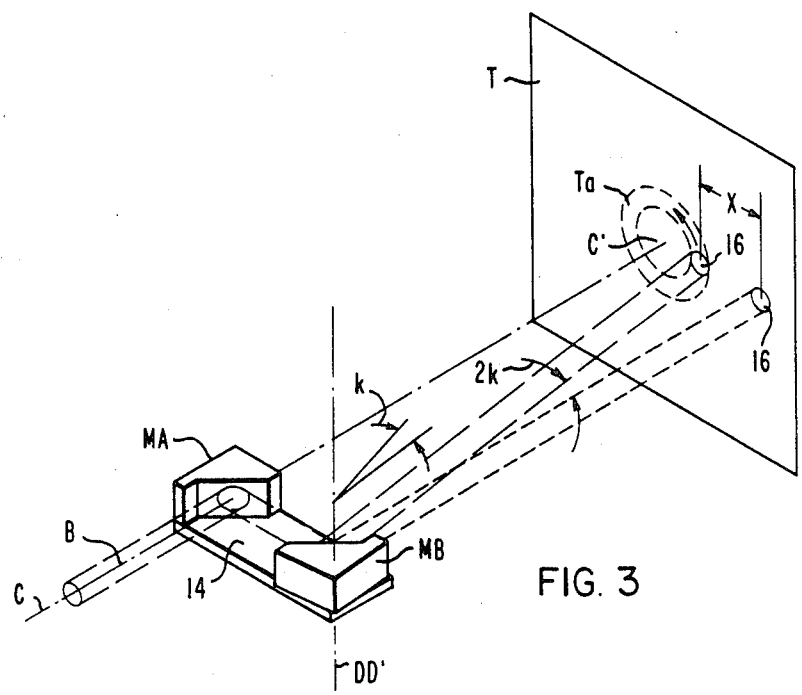
FIG. 3 is a representation of the embodiment of FIG. 2 showing an alignment beam deflected at an angle k with respect to the axis C of the high power beam.

To understand further the embodiment of the alignment system, reference is directed to FIG. 3. In this figure the mirror MB has been rotated through an angle k about the axis D—D'. This axis is oriented parallel to the reflecting surface of mirror MB and perpendicular to the line C—C'. The result of this rotation is to cause the deflected portion alignment beam path segment after mirror MB to rotate through an angle 2k, resulting in a displacement X of the image spot 16 on the target T. Now as the mirror assembly 14 is rotated, the image pattern Ta is a circle of smaller size.

If the angle k of FIG. 3 is increased, the displacement X increases and the image pattern could ultimately become a single spot at C' that is coincident with the location of the initial alignment beam spot on the target T (if the rotating mirror assembly is removed). This very feature can be used as a means of determining that the rotating mirror assembly 14 has been properly adjusted and inserted into position. Any asymmetry of the image pattern relative to the position of the undisturbed image spot or failure of the image pattern to "close down" on this spot indicates a malfunction of the rotating mirror assembly. Recognizing these facts, the value of the modified alignment laser system of the present invention can be appreciated.

Figure 4:
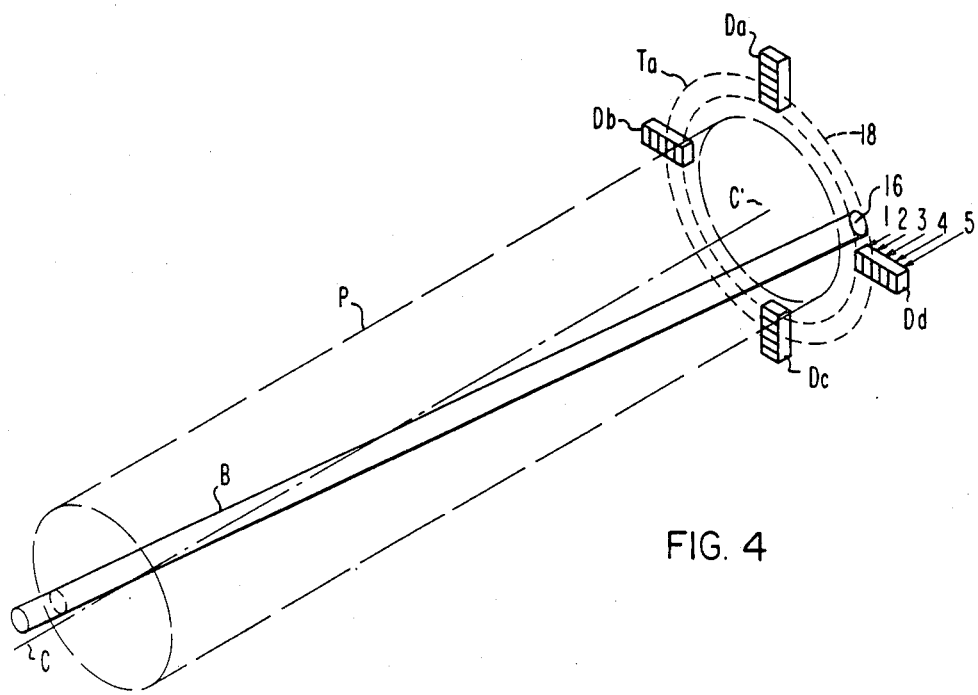
FIG. 4 is a schematic representation illustrating cross-axis deflection of the alignment beam.

There are several features of the alignment system that should be noted. First, the performance of the rotating mirror assembly 14 as exemplified in FIG. 3 could be equally well achieved by rotating mirror MA rather than MB. As before, the axis of rotation would be perpendicular to the line C—C' and parallel to the surface of MA. In a practical sense, this rotation might be easier to accomplish while the mirror assembly is rotating. Secondly, it is important that the rotation of mirror MB, or MA as noted above, can be done while the mirror assembly 14 is rotating about the axis C—C'. Several techniques can be used to achieve the rotation of MB. These techniques include hydrostatic, piezo-electric, small motors, etc. (not shown). A third point to note is that if the angle k in FIG. 3 is increased further the image of the alignment beam will cross the axis C—C' and produce an image pattern as shown in FIG. 4. In this figure one orientation of the alignment laser beam is shown. If k is increased further, the diameter of the image pattern increases and the pattern can go completely off the target.

In FIG. 4, the line C—C' represents the desired optical axis and is also the axis for rotation of the mirror assembly shown in FIGS. 2 and 3. The dotted cylindrical section P represents the desired high power laser beam path. The image pattern that would be observed if a target were present is shown by two concentric dotted circles 18 as was done in FIGS. 2 and 3.

In the embodiment of FIG. 4, in place of a target, a set of four linear array detectors Da-Dd have been positioned symmetrically around the line C—C' as shown. The surfaces of detectors D (subscript deleted) are in a common plane that is perpendicular to C—C' and the individual detectors D are located radially equidistant from C—C' and pointed toward C—C'. In this example it may be assumed that there are five active elements in each detector D as indicated by the numbers 1, 2, 3, 4, 5 shown from the innermost to outermost elements associated with only one of the detectors Dd. Also note that the detectors D are located at symmetrical positions outside the desired high power main laser beam path P and therefore can be left in place permanently, when the main laser is turned on.

The linear array detectors D used in this embodiment are state-of-the-art commercial devices presently available. The detectors D are required to produce an electrical signal proportional to the intensity of the alignment laser beam trace 16 incident in them. Various types of photoconductors, photovoltaic, pyroelectric, etc., devices are available for this application. The spectral, wavelength sensitivity of the detectors D used will be dictated by the radiation wavelength of the alignment laser used.

Figure 5A:
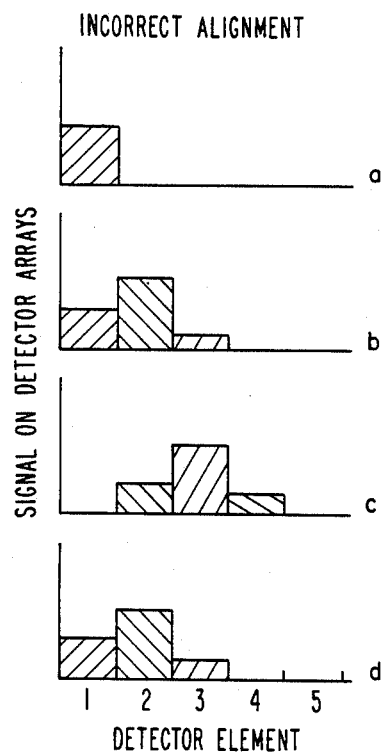
FIGS. 5A–5B are graphical representations of the energy distribution falling on multiple element detectors in which incorrect alignment of the beam and correct alignment of the beam are respectively illustrated.

As the mirror assembly 14 rotates (see FIG. 3), the alignment laser beam B will rotate, sweeping across the detectors D in order. Detectors D produce electrical signals proportional to incident light intensity. The electric signals produced by the detectors D can be used to judge if the image pattern Ta (see FIGS. 5A and 5B), is symmetrical with the set of four detectors. (It should be noted that three detectors are sufficient to uniquely define the position of the image pattern. However, use of four detectors in an orthogonal array is more compatible with the orthogonal angular adjustments normally used on mirror mounts.) The plots of detector signals shown in FIG. 5A give examples of results that may be obtained. Detectors Da and Dc are above and below the line C—C' in FIG. 5A while detectors Db and Dd are at respective left and right sides of C—C'. The set of four detector output signals A-D corresponding to detectors Da-Dd illustrated correspond to incorrect alignment of the system. Looking at the signals, one observes a symmetry for detectors Db and Dd, indicating alignment of the system in this horizontal direction. The signals A and C for detectors Da and Dc are different. The direction of the asymmetry indicates that the optical axis C—C' is low, i.e., there are signals on elements 2, 3, and 4 of detector Dc that are further from the desired axis than on detector Da. If appropriate adjustments are made on the elevation angle control of the mirror mount (not shown but noted in the prior art section), the signals on detectors Da and Dc can be made symmetrical and a correct alignment is achieved as is shown by the detector signals in FIG. 5B.

Figure 1:
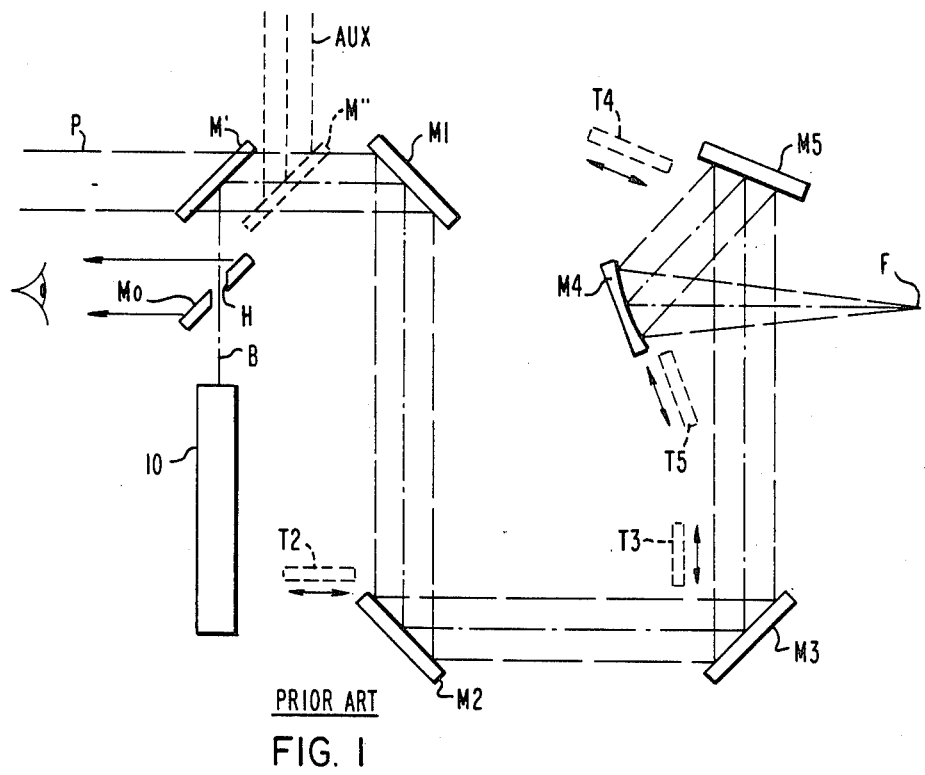
FIG. 1 is a schematic representation of a prior art laser alignment system.
Figure 6:
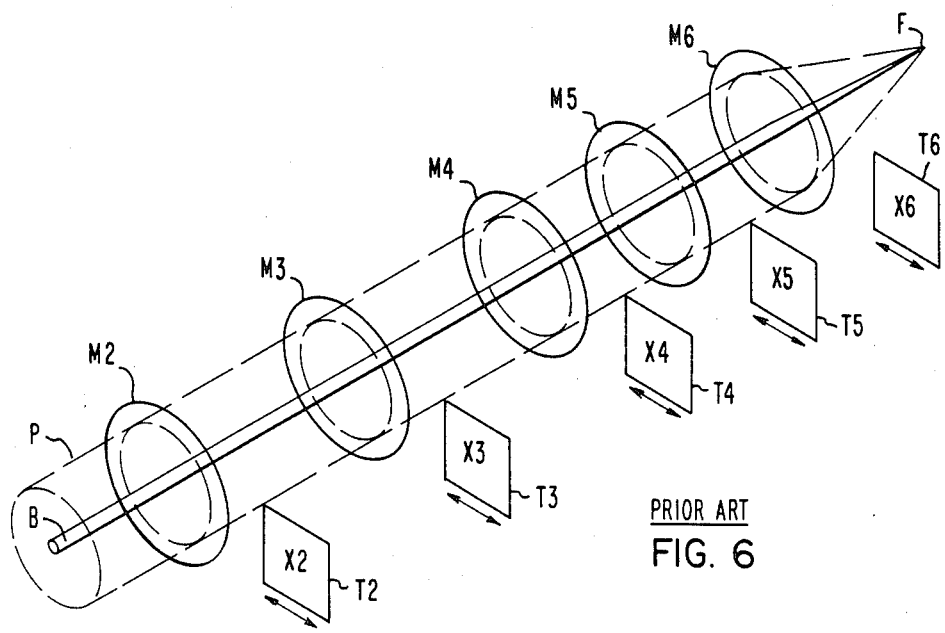
FIG. 6 is a schematic representation illustrating the principle operation of a prior art alignment system for a multi-element laser beam transport apparatus.

To fully explain the proposed optical system alignment concept consider the conventional alignment of a complicated multimirror system like that shown in FIG. 1. To facilitate this explanation and to simplify the drawings, advantage may be taken of the fact the mirrors M2-M6 only change the direction of the radiation. Thus, the analysis of a multimirror system may be simplified by arranging all the path lengths or segments between mirrors M2-M6 along a common line, terminating at focal spot F (see FIG. 6). In this case five mirrors M2-M6 will perform the alignment using inserted targets T2-T6 as with FIG. 1. The alignment is performed by inserting target T2 in place in front of M2 and adjust M1 (not shown in the figure), until the alignment laser beam B strikes the proper spot (X2) on T2. T2 is then removed and T3 inserted and the adjustments performed on M2 to bring the alignment laser beam B onto the proper spot (X3) on T3 and likewise for the remaining mirrors.

Figure 5B:
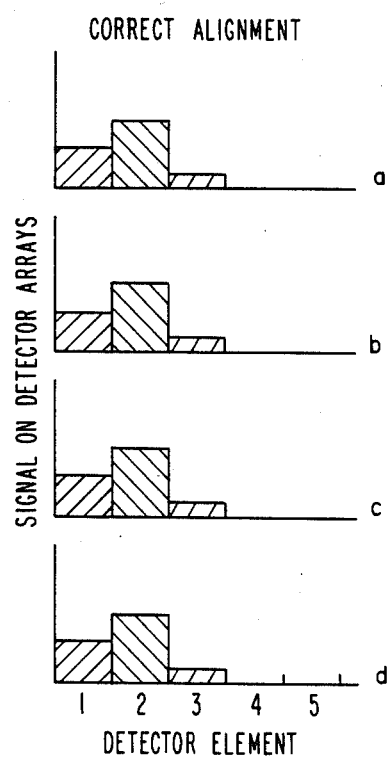
Figure 7:
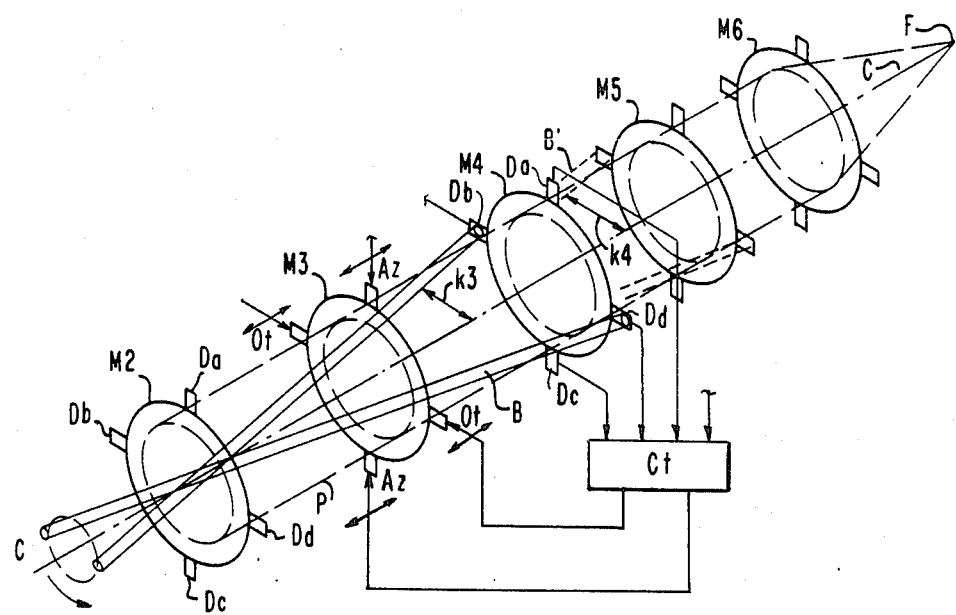
FIG. 7 is a schematic illustration representing the principle operation of the alignment system of the present invention for a multi-element laser beam transport apparatus.

With the aid of FIG. 7, the proposed alignment system of the present invention can be explained. In the figure, five mirrors M2-M6 are shown with sets of four linear array detectors Da-Dd located symmetrically about the desired axis C—C' and outside the high power laser beam path P (dotted cylinder) as prescribed in the discussion of FIG. 5. The rotating alignment laser beam is shown in FIG. 7 as a solid cylinder beam B making an angle k3 with respect to C—C'. Beam B is used to align mirror M3 on mirror M4. For example, controller Ct receives outputs of detectors Da-Dd and provides outputs to orthogonal elevation control Ot and azimuth control Az on M3, which may be adjusted until similar signals are obtained on all detectors Da-Dd on M4 as shown in FIG. 5B. Once this is accomplished, the angle k on MB (FIG. 3), is decreased to k4 (FIG. 7) causing the rotating alignment laser beam (now B') to strike the detectors Da-Dd on mirror M5. M4 is then adjusted to center the rotating beam B' pattern on the detectors of M5, thereby performing the alignment of M4. This procedure is repeated for the rest of the mirrors in turn until the final focusing mirror is adjusted onto the target at focal spot F.

One can visualize this alignment as being microprocessor controlled and performed automatically. In this process the mirror M' (FIG. 1), which is located between the rotating mirror assembly 14 (FIG. 2), and the rest of the system, is indexed into place. Mirror MB (FIG. 3), is then rotated by a sufficiently large k, to cause the rotating alignment laser beam to strike the detectors on M2. The signals are interrogated by the microprocessor and the elevation and azimuth controls on M1, (not shown), are adjusted by the microprocessor to produce alignment. The angle k of MB is then reduced until the rotating alignment laser beam strikes the detectors on M3. Mirror M2 is then adjusted. This process is repeated for each mirror until the entire system is adjusted. The mirror M' (FIG. 1) is then removed and the alignment is completed.

Figure 9:
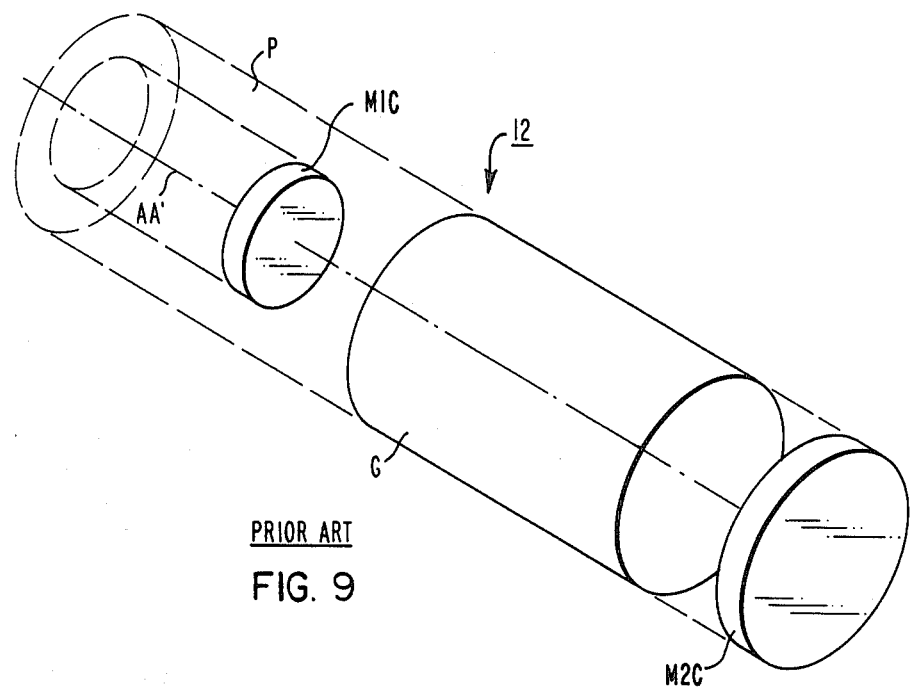
FIGS. 9–11 illustrate prior art laser cavity apparatus and alignment means therefor.
Figure 10:
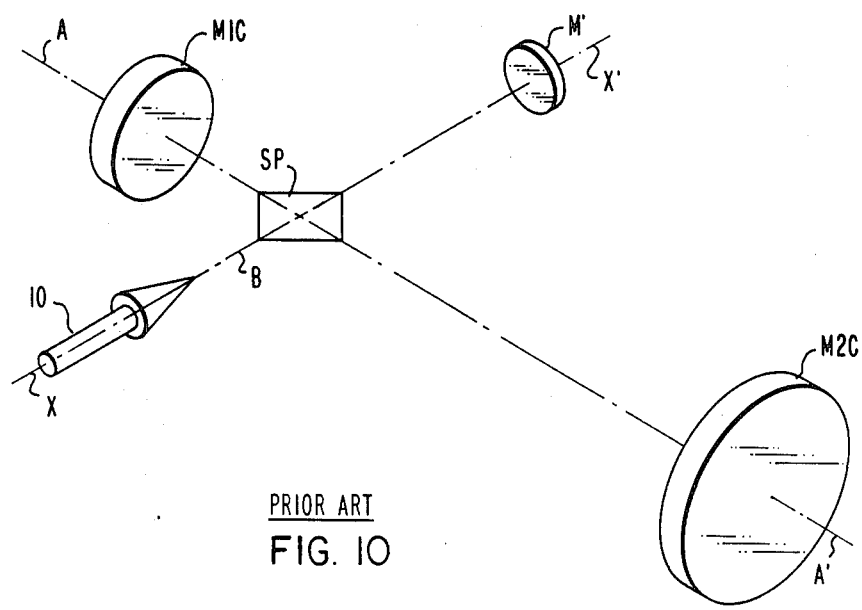
Figure 11:
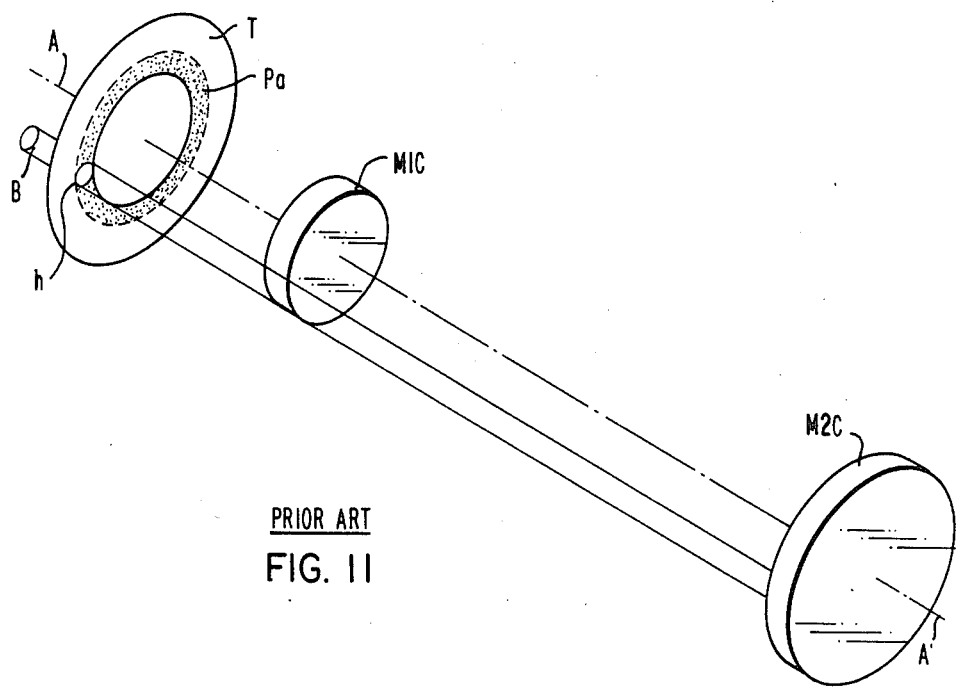

It has been stated that a portion of the high power laser beam P could be used in a self-alignment system. To accomplish this, one would place a beam dump or mask (not shown) in the laser path to stop the entire beam except for a small diameter ray along the beam axis. This small ray of laser radiation is not the alignment laser beam. The alignment procedure in this case is exactly as described above in all features. There are some limitations and definite advantages to self-alignment. The disadvantage is that the technique is not applicable with unstable resonator cavity laser systems. Such lasers have "holes" in the center of the beam as it exits the laser (FIG. 9). The advantage of self-alignment results in cases where there are refractive elements in the optical system. In these cases the alignment laser wavelength is the same as the main beam and effects of variations of index of refraction with laser wavelength is eliminated.

In the embodiment of the proposed optical system alignment concept, a rotating alignment laser beam crosses the desired axis C—C' (FIG. 7). One can, in principle, adjust the angle k (FIG. 3), in the opposite direction, in which case the image pattern of the rotating alignment beam would always be larger than its equilibrium non-parallel size in FIG. 2. Referring to FIG. 7, one can easily see that the sensitivity of adjustment of k to cause the rotating alignment beam to impinge on the detectors of the various mirrors would be much more critical than in the actual case shown. Very small changes in k would cause the image pattern to traverse the whole optical system. Much larger changes in k are required to traverse the whole optical system in the embodiment of FIG. 7 which uses the crossover technique described.

Section II: Alignment with Power Laser on

This section describes an embodiment of the present invention whereby the alignment can be accomplished while the high power laser beam is turned on. This feature permits continuous computer controlled alignment of the beam transport system. Such a feature is highly desirable in laser beam transport systems where mirror deformation due to laser heating might be encountered and in systems where there is relative motion of the mirrors to accommodate manipulation of the laser beam as required in many applications.

FIG. 7 and the associated text above, schematically describes the basic embodiment of the invention for optical alignment of the transport system. A refinement of this embodiment that will provide for continuous alignment of the beam transport system while the high power laser beam P is turned on can be explained with the aid of FIG. 8. The rotating mirror assembly 14 shown functions as described previously. An auxiliary mirror Ma is located in front of the assembly. The mirror Ma has a hole H in its center section which permits the high power laser beam P to pass through unobstructed. This high power laser beam P shown by the dashed cylinder, passes to the three mirrors M2, M3, and M4 and the target or focal spot F that are laid out in a straight line path.

Figure 8:
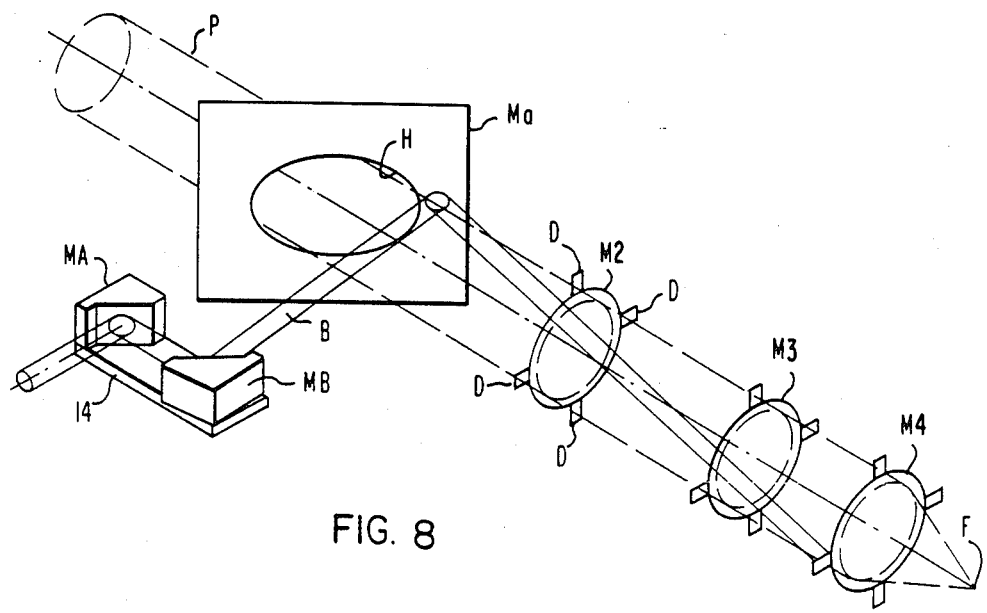
FIG. 8 is a schematic illustration representing another embodiment of the invention utilizing an apertured mirror.

The auxiliary mirror Ma is oriented so that the alignment laser beam B is reflected from the region around the hole H onto the beam path P of the high power laser as shown. As the mirror assembly 14 rotates, the alignment laser beam B traverses the path of the high power laser beam P in the same fashion as described in connection with FIG. 7. As shown in FIG. 8, the rotating alignment laser beam B strikes the linear array detectors D on Mirror M4. Under this condition one would adjust the elevation and azimuth angles of M3 to produce the alignment conditions discussed in connection with FIG. 7.

The alignment process can be executed while the high power laser beam P is turned on. High power beam P passes through the hole H in auxiliary mirror Ma without being disturbed or disturbing the alignment system. It can be completely controlled by a microprocessor (not shown) and can be repeated as frequently as is necessary.

Prior to using this modified concept it is necessary to orient the mirror Ma and the rotating mirror assembly 14 so that the alignment laser beam B is projected along the high power laser beam path P. This can be accomplished by several techniques. For example, the mirror M″ used for the auxiliary path AUX alignment, can be inserted between Ma and M2C in FIG. 9 so that both the alignment laser beam B and the high power laser beam P can be projected along auxiliary path AUX as shown in FIG. 1. The procedure outlined in connection with FIG. 1 can be used to adjust the orientation of Ma and the basic alignment of the rotating mirror assembly 14. Other techniques known to the experienced optical technician can also be used for this initial alignment process.

Section III: Laser Cavity Alignment

This section deals with the alignment of laser cavity optics. Specifically, the invention may be used to align internal reflecting surfaces in high power lasers without disturbing or invading the optical cavity.

In the embodiment of the invention described herein it is not necessary to disturb the laser optical system. In fact, once the alignment apparatus has been installed on a laser, it will be possible, in principle, to monitor the cavity alignment while the laser is operating. Also, the alignment technique does not rely on any visual observation of the alignment laser beam. In this embodiment of the invention, a novel technique is used to modify the performance of the alignment laser by using insitu, non-moving electronic targets as described above. The targets are located outside the beam path normally occupied by the high power laser beam and monitor the alignment beam position.

Figure 12:
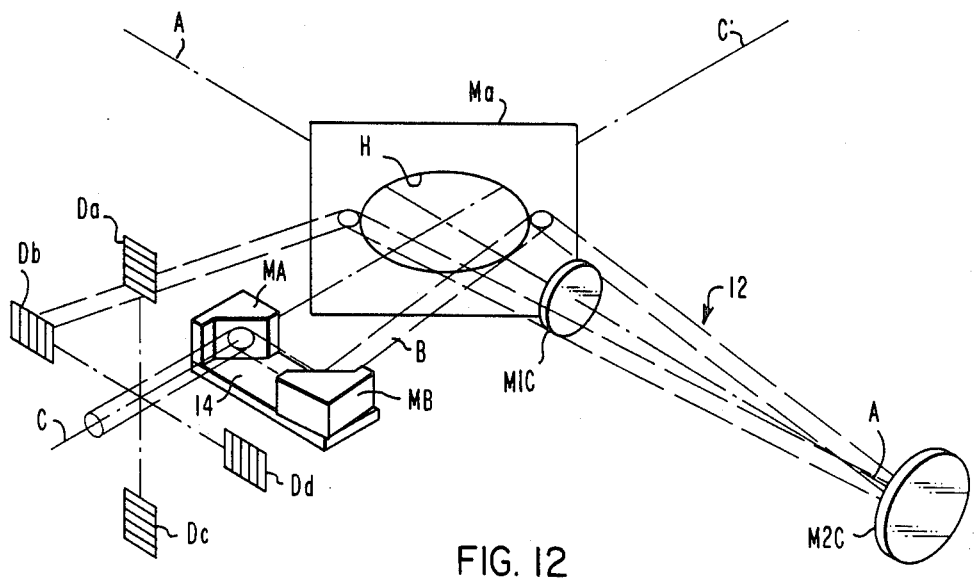
FIGS. 12–14 illustrate a laser cavity alignment apparatus according to the present invention.

The laser cavity alignment concept is shown in FIG. 12. Means is provided using the rotating mirror technique described above for aligning the mirrors M1C and M2C without invading the laser cavity. In FIG. 12, the axis C—C' intersects the laser cavity axis A—A' at a large angle, for example, 90°. Auxiliary mirror Ma is inserted in the alignment laser system so that the alignment laser beam B reflected from mirror Ma travels toward M2C as it would if the rotating mirror system were, itself, located on the cavity axis A—A'. Detectors Da–Dd are located about axis C-C' behind mirror assembly 14. The mirror Ma has hole H in its central section that will allow the main or power laser beam P to pass unobstructed. The alignment apparatus is remote from the laser cavity 12. As the mirror assembly 14 rotates, the alignment laser beam B reflects from the region around the hole H in Ma through the laser cavity 12 and back to auxiliary mirror Ma towards detectors Da–Dd.

Figure 13:
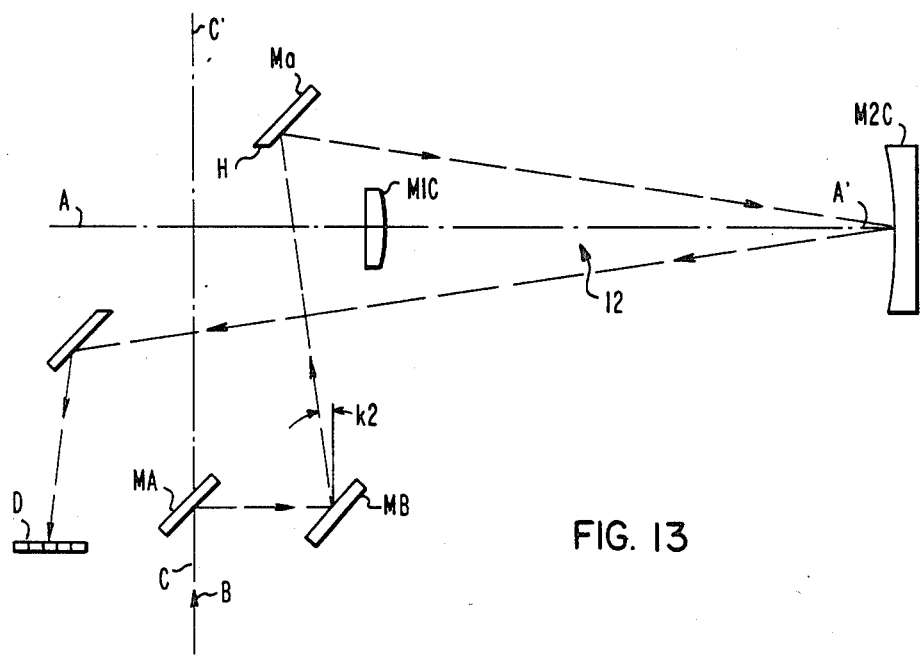

Specifically, the preferred embodiment for the proposed laser cavity alignment technique of FIG. 12 is shown in the 2-dimensional sketch of FIG. 13. In this figure, the alignment laser beam path B is represented by the dashed lines with arrows showing the direction of propagation. All other components have been previously noted and defined. The angular adjustment of mirror MB, causes the alignment laser beam B to make an angle k2 with the axis C—C'. This adjustment is adequate to cause the alignment laser beam to clear M1C on both passes and strike M2C near its center.

Figure 14:
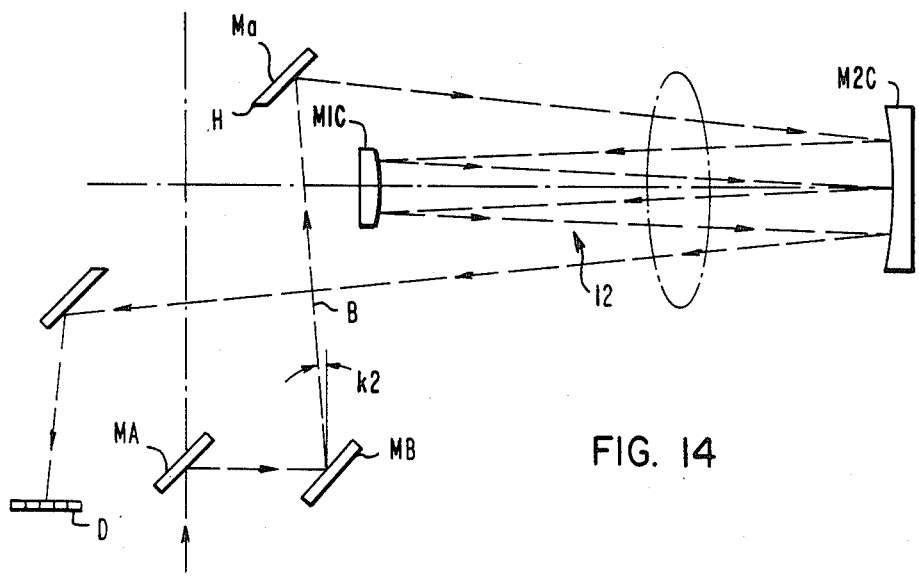

Once laser cavity mirror M2C has been adjusted by balancing the outputs of detectors D, it is possible to adjust M1C by simply rotating mirror MB to decrease the angle k2 to k1. as shown in FIG. 14. In this case the alignment laser beam B strikes M2C at some distance from the axis A—A' and reflects back and forth to M1C thence to Ma towards detectors D as shown. If one now interrogates the detector signals as the mirror assembly 14 rotates and adjusts the elevation and azimuth on M1C to achieve symmetrical or balanced signals, adjustment of M1C is achieved and the unstable resonator laser cavity optics 12 are fully aligned to the axis A—A'.

Figure 15:
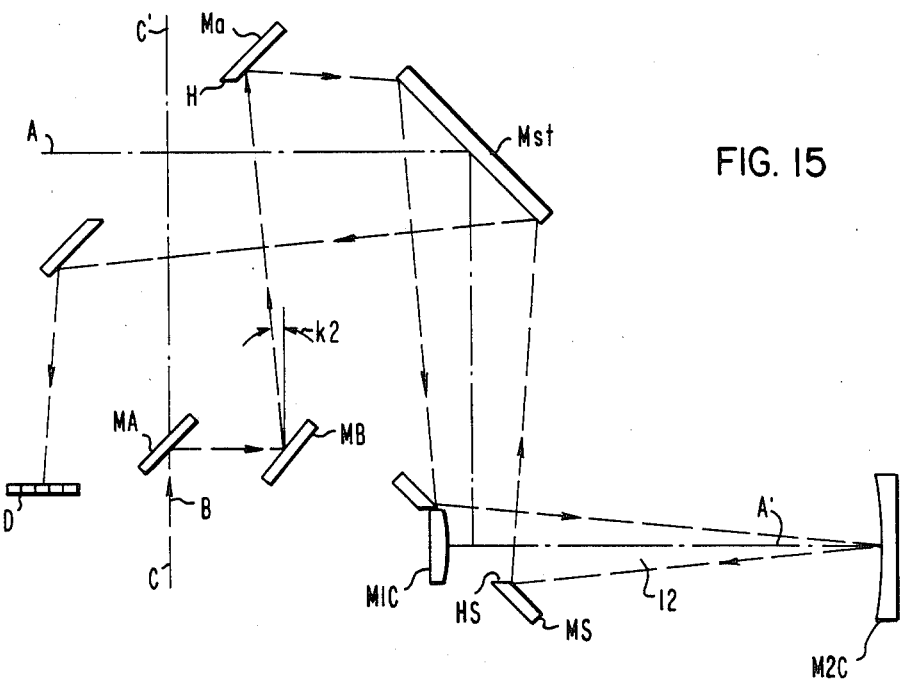
FIG. 15 illustrates another embodiment of a laser cavity alignment apparatus including a scrapper mirror.

In most high power pulsed/CW lasers there are additional mirror components that are also a part of the system and it may be necessary to align the entire system without disturbing these components. An example of such a laser system is shown in FIG. 15 where the dot-dash line labelled A—A' is the desired laser beam path. The mirrors M1C and M2C are the laser cavity mirrors, MS is an apertured flat mirror having a hole HS, frequently called the "scraper", that is used to redirect the laser beam, and Mst is a flat mirror used to "steer" the laser beam. The dashed lines show the path of the alignment laser beam B through the system from the laser source (not shown) to the array of detectors D (only one detector shown). In the figure the mirror MB is adjusted at an angle k2, see FIG. 13, to facilitate alignment of mirror M2C. As the mirror assembly containing MA and MB rotates, the alignment laser beam B traverses paths around each respective hole H and HS in Ma and MS and the alignment of M2C is accomplished as described previously. When mirror MB is readjusted to the angle k1, see FIG. 14, the alignment of mirror M1C can likewise be accomplished.

In the embodiment of the proposed technique for alignment of unstable resonator laser cavity optics described above, the rotation axis C—C' of the rotating mirror assembly may be aligned with the desired laser cavity axis A—A' either directly (not shown), or via the auxiliary mirror Ma shown in FIGS. 12-15. There are various state-of-the-art techniques available to the optical technician to accomplish this alignment which will not be discussed herein.

Another special feature of the proposed alignment concept that should be noted is that the alignment/monitoring of the mirrors M1C and M2C can be done simultaneously. To accomplish this it is necessary to have simultaneous alignment laser beams deflected off of MB at angles k1 and k2. To sort out the signals on the linear array detectors, it would be desirable to use two sets of detectors and two different alignment laser wavelengths. Alternately, one could use two rotating mirror assemblies on a common axis C—C'. These mirror assemblies would be located one in front of the other and staggered in position about the rotation axis C—C' so that their beams do not interfere with the others structure. The linear array detectors could be time shared in this case. Also in this case, it would be necessary that the mirror MA on the "front" assembly be partially transparent, allowing a part of the alignment laser beam to be transmitted to the second rotating mirror assembly.

Section IV: Combined Transport and Laser Cavity Alignment

The purpose of this section is to identify a means whereby the previously described alignment concepts can be combined to provide a complete laser alignment system. Section I describes a novel technique for the alignment of laser beam transport systems that might be used to interface a laser with a particular application.

The material in Section II describes a technique for adjusting the alignment of a main laser with the power turned on. The material in Section III describes a technique for aligning laser cavity optics without "invading" the laser cavity and/or laser optical system. The embodiments of the alignment technique described therein pertain to the alignment of unstable resonator laser cavity optics. The technique described could be applied equally well to other laser cavity optics configuration.

In this Section IV the same modification of performance of the alignment laser as in Section I is employed. It is the common use of the modified alignment laser that permits these two alignment concepts of Sections I and III to be integrated into the complete laser alignment system that will be described below.

In describing the complete laser alignment system, the details of the auxiliary alignment laser and its associated optics will be primarily considered. The manner in which this alignment laser is used to align the laser cavity optics and the beam transport system has been discussed in detail.

Figure 16:
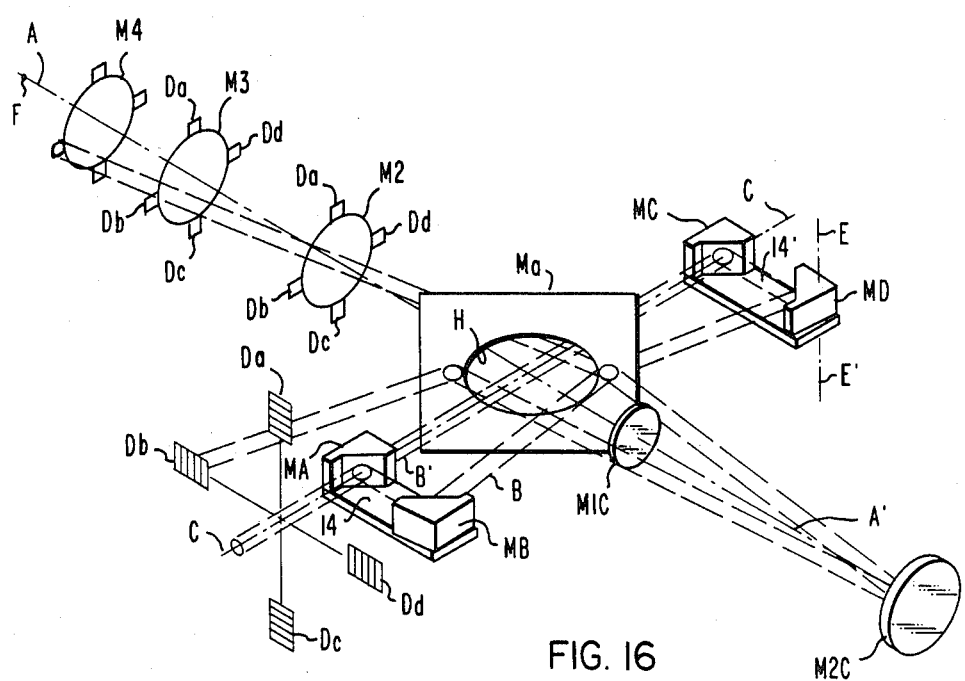
FIGS. 16–19 illustrate various embodiments of a combined laser cavity alignment apparatus and a beam transport alignment apparatus according to the present invention.
Figure 17:
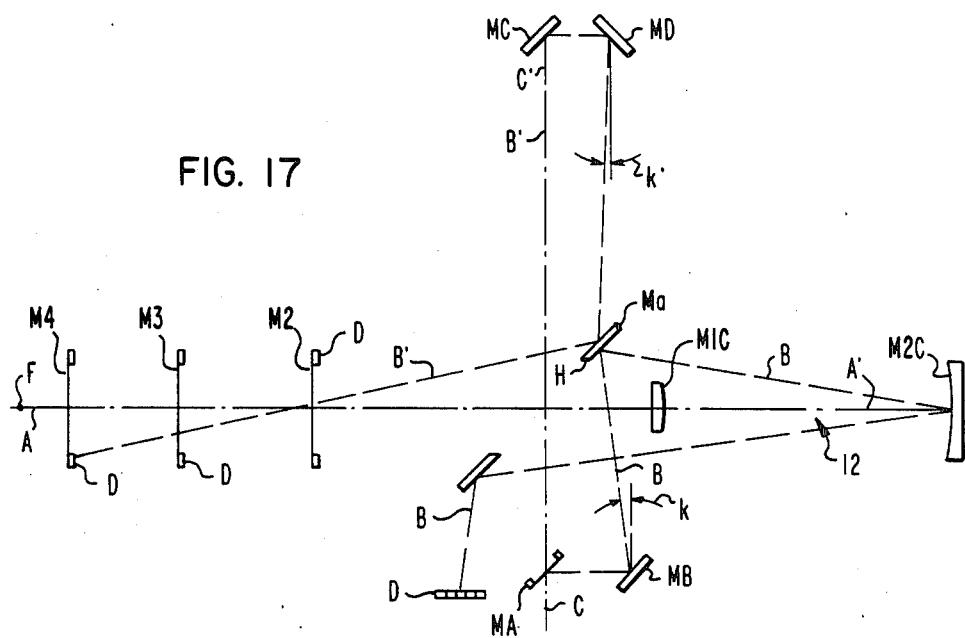

The operation of the complete laser alignment system can be understood with the aid of FIGS. 16 and 17. Reference will be made to other figures as necessary. The axes A—A' and C—C' in FIGS. 16 and 17 are the alignment axes of the main laser system/laser cavity and the alignment laser system, respectively. These axes are nominally oriented perpendicular to each other. The auxiliary mirror Ma is located at the intersection of A—A' and C—C' and is oriented to reflect the alignment laser beam B from its A—A' direction to the C—C' direction.

The mirrors MA and MB are mounted on rotating structure 14 that rotates about the axis C—C'. Mirrors MC and MD are mounted on a second structure 14' that also rotates about the axis C—C'. Mirrors MD can also be rotated about axes E—E' in a manner similar to mirror MB described earlier. Similarly Mirror MC can rotate about its vertical axis if desired. These latter rotation axes are perpendicular to C—C'. In this embodiment, the mirror MA is partially transmitting so that a portion of the alignment laser beam B incident thereto is transmitted as beam B' onto mirror MC. The mirror MA is also very thin, as in a pellicle membrane, so that there is little or no sidewise shift of the alignment laser beam transmitted onto MC.

The alignment of the laser cavity optics 12 which consists of mirrors M1C and M2C is accomplished using the rotating mirror assembly 14 containing MA and MB. As the assembly 14 rotates the alignment laser beam B reflected from MB moves around the hole in Ma and onto M2C as shown. Alignment laser beam B reflects back to Ma and onto the linear array detectors D (only one detector shown) located behind MA or axis C—C'. The techniques for aligning M1C and M2C to the main laser optical axis A—A' as described above in Section III.

That part of the alignment laser beam transmitted by MA (referenced as B') is reflected by mirrors MC and MD onto the reverse side of Ma at angle k' (FIG. 17). Beam B' is, in turn, reflected along A—A' towards mirrors M2-M4 in the same direction that the main laser beam travels. As the second rotating mirror assembly 14' (FIG. 16) containing MC and MD turns, the reflected alignment laser beam B' is used to align mirrors M2-M4 in the laser beam transport system in the same way as described in Section I by varying angle k' of mirror MD. Non-moving linear array detectors Da-Dd for each mirror M2-M4, are used to facilitate controlled alignment of the mirrors.

As noted above, alignment of the laser cavity mirrors M1C and M2C will cause the main laser beam P (not shown) to be projected along the axis A—A'. Also as noted above, the other mirrors M2-M4 in the laser beam transport system can be aligned to this axis A—A' using rotating mirrors MC and MD. Having achieved this condition, the rotating angle k of mirror MD can be set to near zero causing the alignment laser beam B' to project along A—A' to the target/work piece at F.

This feature may be particularly valuable in military laser systems. In this case the transmitted alignment laser beam B' can serve as a target designator. It may be desirable to use different laser wavelengths for target designation and for laser system alignment. Since the alignment system uses only reflective optics, except for MA, one could project multiple wavelength alignment laser beams through the system. The transmission/reflection characteristics of MA could be adjusted so that the designator laser wavelength would be transmitted to MC and then through the optical system to the target.

Figure 18:
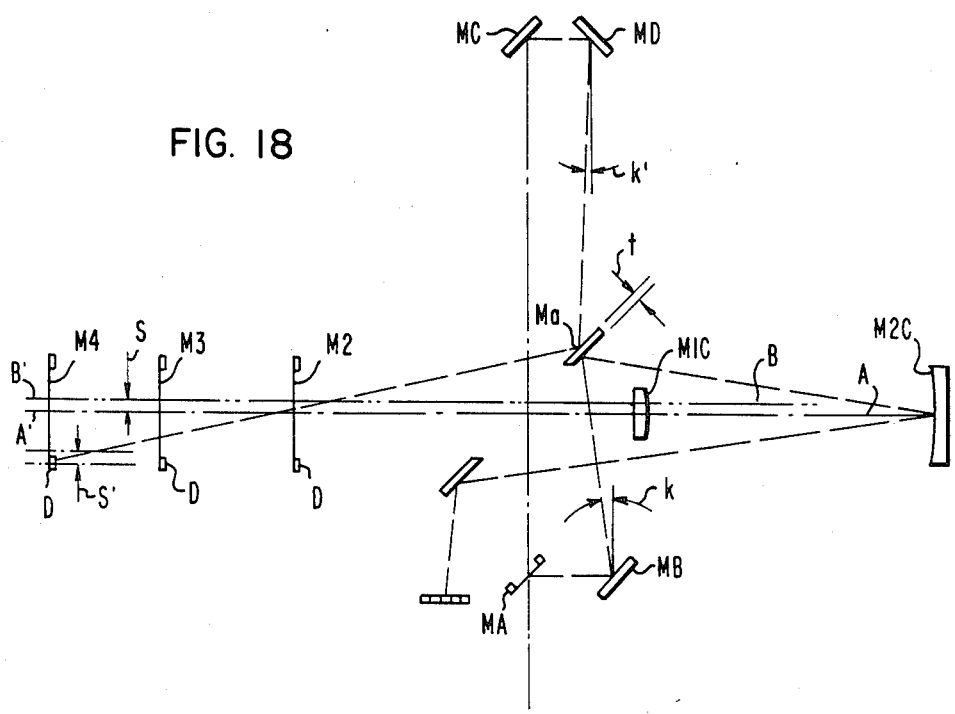

Thus far in the description of the laser alignment concept the physical thickness of mirror Ma has been ignored. As noted, the alignment laser beam reflected from MC and MD will reflect from the reverse side of Ma and along the main laser beam axis A—A'. Due to the finite thickness t of Ma the center of rotation of this rotating transport optics alignment laser beam B' will be off-set from the A—A' axis. This effect is shown in the drawing of FIG. 18 where the axis of the transport optics alignment laser beam B' after it is reflected from the back side of auxiliary mirror Ma is shifted to axis B—B' by an amount S. To compensate for off-sets it is necessary to off-set the linear array detectors by S' for mirrors M2-M4 so that the axis B—B' defines their centers. Having done this, the mirrors M2-M4 in the laser beam transport system can be aligned so that the main laser beam will pass along the axis A—A'.

Figure 19:
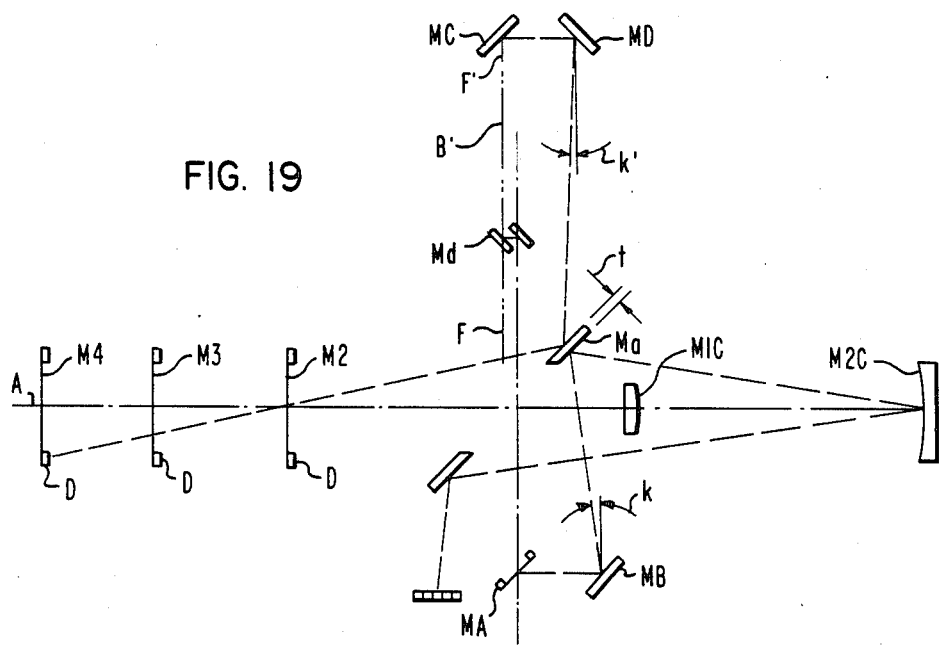

There are other techniques for compensating for the finite thickness of Ma. One such technique involves providing an off-set deflecting mirror mirror set Md in the auxiliary laser beam path B' between MA and MC causing the beam B' to be offset to axis F—F'. MC and MD are then rotated about off-set beam path F—F'. FIG. 19 shows the optical configuration for this case. The laser beam deflector set Md off-sets the alignment laser beam from the initial path C—C' to the new path F—F' which is parallel to C—C' and in the plane defined by A—A' and C—C'. The displacement of F—F' from C—C' is such that when MC and MD rotate about F—F', the beam reflected from the reverse side of Ma is again centered on the main laser beam axis A—A'. Under this condition the alignment of the mirrors in the laser beam transport system and the target designation is the same as if Ma was extremely thin as initially assumed.

Section V: Single Detector Element System

The accuracy of alignment that can be achieved with the described alignment laser system will depend on several factors. First the detectors Da"–Dd", see FIG. 20, must be properly located and secured in place. A second factor is the size and intensity profile of the alignment laser beam B. Ideally, however, one would like a small beam diameter, say 1 mm for example, and a uniform intensity profile with a sharp outer boundary. With such a laser beam profile one could most probably use single element detectors. Since the alignment laser beam will probably be large in diameter and have intensity profile variations caused by both divergence and defraction, one would normally use deflector arrays having multiple elements.

The limit to the number of elements used will be dictated by the alignment accuracy required and the complexity of electrical circuitry that can be tolerated. In FIGS. 5A and 5B it has been assumed that the sensitivities of each element 1–5 of the detectors D are identical, otherwise one would not observe the same "signature" for each detector in each figure corresponding to correct alignment. Some variability in the detector element sensitivities will be encountered. By proper calibration of detector sensitivities and real time computer manipulation of the signals, compensation for detector variation may be made.

Figure 20:
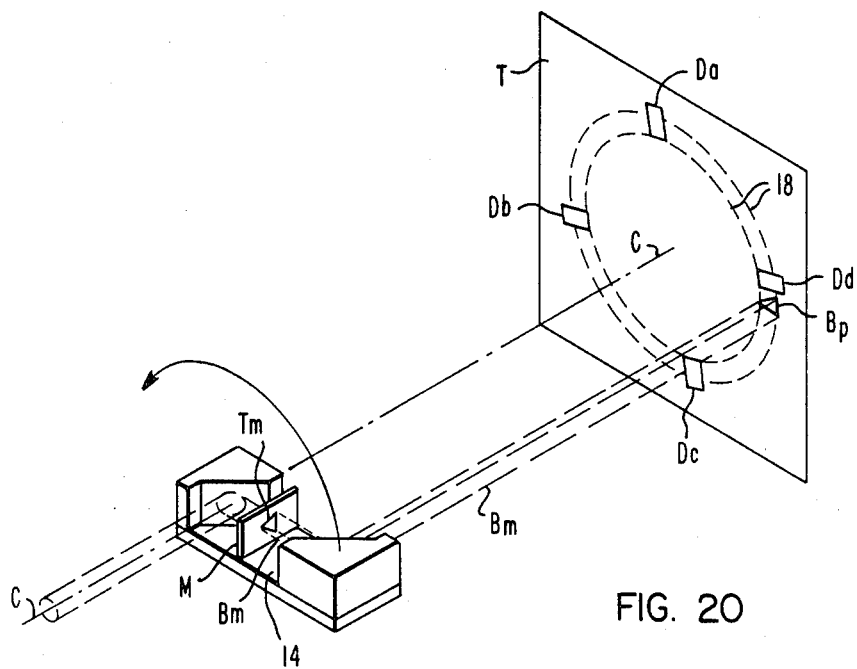
FIGS. 20-21 are illustrations of another embodiment of the invention illustrated in FIGS. 2-4 with a masked detector.

The comments above suggest that while accurate optical alignment can be achieved using the described alignment system, the required electrical circuitry, calibration of detector sensitivities, and computer manipulation of the detector output signals may be extensive. By a simple modification to the alignment laser system it is possible to greatly simplify the practical application of the alignment concepts. This change in the alignment laser system can be explained with the aid of FIGS. 20 and 21. FIG. 20 is identical to FIG. 2 except for two important features. First, a mask M has been placed in the rotating portion of the upper optical path of Beam B (for example, one surface of mirrors Ma and MB or in the optical path between mirrors MA and MB, or MB and target T). Second, single detector element detectors Da"–Dd" are placed in the target area.

Figure 21:
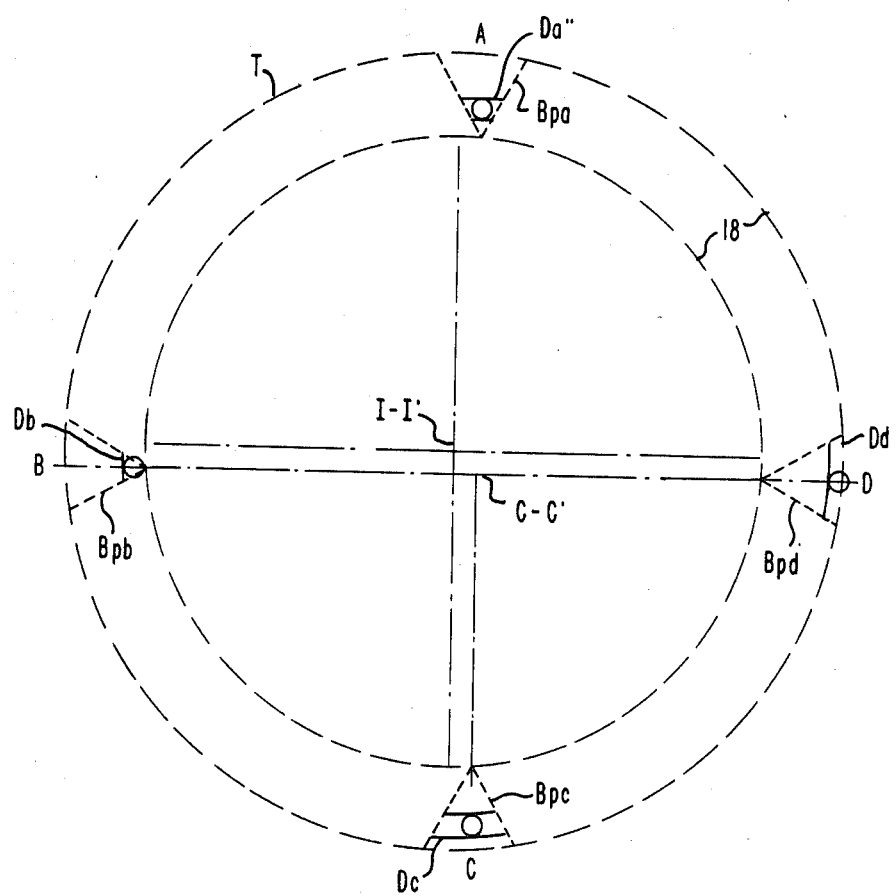

The purpose of this mask M is to produce a special cross sectional shape for the alignment laser beam Bm after it leaves Mask M (see FIG. 21). In FIGS. 20 and 21, mask M has a triangular opening Tm producing masked beam Bm likewise having the cross sectional shape of a triangle. (As will become apparent later, various cross sectional shapes for the alignment laser beam can be used.) As the rotating mirror assembly 14 turns on the axis C—C', the triangular shaped pattern Bp of alignment laser beam Bm turns on the target T as well.

The single element detectors Da"–Dd" are located in a common place perpendicular to C—C' and the individual detectors are located equi-distant from C—C'. The two concentric "dashed" circles 18 define the path of the rotating alignment laser beam Bm as it traverses the detectors. Triangles Bp represent the pattern of masked beam Bm on target T.

The operation of the improved alignment concept can be explained with the aid of FIG. 21 which corresponds to a mis-aligned condition. FIG. 21 shows a flat view of the four single element detectors Da"–Dd", represented by small circles, located symmetrically about the desired optical axis C—C'. The axis I—I' and the concentric dashed circles 18 represent the initial axis of the rotating alignment laser beam Bm and its image pattern Bp on the detectors Da"–Dd", respectively. A dotted triangle Bpa-Bpd is shown at the respective location of each detector Da"–Dd". The triangle represents the modified or masked cross sectional profile of the alignment laser beam B, see FIG. 20. As the mirror assembly 14 shown in FIG. 20 rotates, causing the alignment laser beam to precess about the initial axis I—I', it is clear that different parts of the triangular shaped beam profile Bm will cross each detector D. The corresponding temporal shapes of the electrical signals from the detectors will all be different. For example, the duration of the electrical signal from the detector Da" at position A will be shorter than the duration of the electrical signal from the detector Dc" at position C since the pattern Bpa of alignment laser beam Bm traverses the detector at Da" much faster than the pattern Bpc that traverses detector Dc". In a similar fashion, the total integrated electrical signal from the detector Da" will be less than that for the detector Dc". If one adjusts the alignment of the mirrors so that the initial axis I—I' moves toward C—C', the duration of the electrical signals from all four detectors will become equal, as will the total integrated electrical signals also.

In all the modes of determining optical system alignment it is assumed that the mirror assemblies 14, 14' of the various figures rotate at a constant angular velocity.

From the above discussion it is clear that a unique alignment of the optical system can be achieved using a set of four, or even three, matched single element detectors by adjusting the mirrors of the system to obtain equal signal durations and/or integrated signal levels on each detector. It is also clear that different cross sectional profiles for the alignment laser beam could be used in this application. Furthermore, if the detectors are accurately located in symmetrical fashion, the variation in the time delays between the electrical signals from adjacent detectors can also be used as a means of determining optical system alignment.

In the discussion of the laser cavity alignment system reflective optics have been featured as optical elements. However, it should be understood by those skilled in the art that it is also possible to utilize the present invention in laser systems having optical elements in the laser cavity of the partially reflective refractive type. Such partially reflective refractive optical elements could be substituted for the mirrors M1C and M2C hereinbefore described (see FIG. 13 for example). In such a system the alignmemt process could be accomplished in a manner similar to that described with respect to FIG. 13 except that if M1C were a partially reflective refractive element, the beam B could be passed directly through M1C rather than around it during the alignment of M2C. Thus, the invention is not limited to only reflective type optical systems.

There are several features of the proposed alignment technique that should be noted again. First, the alignment process does not rely on visual observation of the alignment laser beam, and it is thus possible to use alignment laser wavelengths that are outside the visible spectrum. The only real limitation on the alignment laser wavelength is the spectral response of the linear array detectors that are used. Second, both laser transport and laser cavity optics can be readily aligned. Another feature that should be noted is that the entire alignment process can be microprocessor controlled and performed automatically. For example, in the laser cavity alignment process the mirror MB would first be adjusted to angle k2 and mirror M2C aligned (FIG. 14). Then MB would be rotated to angle k1 and mirror M1C aligned (FIG. 15). The mirror MB could then be rotated back and forth between k1 and k2 and the alignments of cavity mirrors M1C and M2C checked as frequently as necessary.

There has thus been provided a system for aligning the transport optics and cavity optics of laser systems. A variety of optical devices, including rotating and apertured mirrors are utilized to non-invasively provide optical alignment paths. Detectors of various kinds may be used and a microprocessor control may be implemented if desired or provided for automatic and continuously adjustable laser optics.

I claim:

1. An apparatus for aligning the axis of a main laser beam with at least one optical element to be aligned of a plurality of such optical elements carrying the main laser beam by means of an alignment laser producing an alignment beam comprising:
    alignment means for aligning the axis of the alignment laser beam with a portion of the axis of the main laser beam;
    deflecting means for deflecting the alignment beam from the main beam;
    at least one fixed target being associated with and having a corresponding target center located downstream of the optical element to be aligned;
    rotating means for rotating the deflected alignment beam in an annular sweep centered relative to the target downstream of the optical element to be aligned;
    detector means mounted symmetrically about the corresponding target center of the associated target for detecting the position of the annular sweep relative to said target center and producing a corresponding indication;
    adjusting means responsive to the detector means indication for adjusting the optical element to be aligned relative to the main beam so that the corresponding target center of the associated target is aligned with the center of the detected annular sweep.

2. The apparatus of claim 1 wherein the deflecting means includes means for offsetting the alignment beam relative to the main beam.

3. The apparatus of claim 2 wherein the offsetting means includes a pair of opposed spaced mirrors, one mirror obliquely located in the main beam axis for intercepting and deflecting the alignment beam from the main beam axis and the other mirror located adjacent the main beam axis for intercepting and further deflecting the alignment beam relative to the main beam axis.

4. The apparatus of claim 3 wherein at least one of the mirrors is rotatable about its axis to thereby deflect the alignment beam at an angle relative to the main axis.

5. The apparatus of claim 1 wherein the detector includes photosensitive means circumferentially located about a point positioned relative to the target and at uniform radial locations from said point.

6. The apparatus of claim 5 wherein the detectors each comprise linear array detectors extending radially of said point for producing outputs varying radially in accordance with the intensity of the deflected alignment beam impinging thereon.

7. The apparatus of claim 5 wherein each detector comprises a single photo detector responsive to the alignment beam for producing an output when illuminated thereby.

8. The apparatus of claim 7 further including mask means located in the path of the deflected alignment beam for varying the size of the beam, the output of the detector means varying in accordance with the size of the masked alignment beam so that when the duration of the output of each detector means is the same, the main beam is aligned with the desired point.

9. The apparatus of claim 1 wherein the alignment portions of the alignment beam and main beam are co-linear.

10. An apparatus for aligning the axis of a main laser beam with at least one optical element to be aligned of a plurality of such optical elements for carrying the main laser beam by means of an alignment laser beam comprising:
    means for orienting the axis of the alignment laser in a selected orientation relative to the axis of the main laser beam and the optical elements so that the alignment laser is carried by the optical elements;
    deflecting means for deflecting the alignment beam from an initial path of travel;
    at least one target associated with and located downstream of the optical element to be aligned with the main laser beam;
    rotating means for rotating the deflected alignment beam in an annular sweep about a selected point axially aligned with the associated target;
    apertured deflector means aligned with the main beam axis and the main laser axis for receiving and deflecting the annular sweep of the alignment beam and directing it in a selected direction offset from the axis of the main laser beam and towards the optical element to be aligned, said alignment beam to be carried by the apertured deflector means in the direction of the associated target, the aperture being aligned so as to allow the main laser beam to pass therethrough;
    detector means located in the path of the deflected annular sweep of the alignment beam and positioned about the associated target for detecting the position of said deflected annular sweep relative to the main beam axis and the optical element to be aligned and producing a corresponding indications of the relative misalignment of the main beam with respect to said optical element; and
    adjusting means responsive to the detector means indication for adjusting the position of the optical element to be aligned relative to the main beam so that the detector indications are uniform whereby axis of the main beam passes through the center of the detected annular sweep.

11. The apparatus of claim 10 wherein the main laser has an optical cavity and adjustable opposed optical elements therein and the adjusting means is operative to move the opposed optical elements relative to each other for aligning the main beam with the desired point.

12. A method of aligning the axis of a main laser beam with at least one optical element of a plurality of such optical elements for carrying the main laser beam by means of an alignment laser beam carried by said optical elements comprising the steps of:
   aligning the axis of the alignment laser beam with a portion of the main laser beam so that the aligned portions of each beam are co-linear;
   deflecting the alignment beam from the main beam axis;
   establishing a targt downstream of and associated with the optical element to be aligned;
   rotating the deflected beam about the axis of the main beam in an annular sweep centered relative the target associated with the optical element to be aligned;
   sensing the position of the annular sweep about the associated target relative to the axis of the main beam and the associated optical element to be aligned and adjusting the position of the optical element to be aligned with respect to the associated target to direct the annular sweep about the center of the annular sweep being sensed.

13. A method of aligning the axis of a main laser beam with an optical element of a plurality of such optical elements carrying the main laser beam by means of an alignment laser carried by the optical elements comprising the steps of:
   aligning the axis of the alignment laser beam in a selected initial orientation relative to the main laser beam and the optical elements;
   establishing a target associated with and downstream of the optical element to be aligned;
   deflecting the alignment beam from its initial path and rotating the deflected beam about the initial axis in an annular sweep directed towards the optical element to be aligned and centered at a point aligned relative to the associated target;
   sensing the position of the annular sweep relative to the axis of the main beam and adjusting the position of the optical element to be aligned so that the center of the desired point is aligned with the center of the annular sweep being sensed to thereby align the main axis with the target associated with the optical element to be aligned.

14. The method of claim 13 further including deflecting the offset rotating annular sweep towards the desired point and passing the main beam relatively unobstructed through the point aligned with the desired point.

15. A method of aligning the axis of a main laser beam with at least one optical element to be aligned of a plurality of such optical elements carrying the beam by means of an alignment laser beam carried by the optical elements comprising the step of:
   aligning the axis of the alignment laser beam relative to the orientation of the main laser beam and the optical elements;
   establishing a target associated with and downstream of the optical element to be aligned;
   deflecting the alignment laser beam off its initial path and rotating the deflected beam thereabout in an annular sweep directed towards the optical element to be aligned and centered at a point;
   varying the deflection of the annular sweep for moving the center of the annular sweep along a line directed towards the optical element to be aligned for carrying the annular sweep towards the target associated therewith;
   sensing the position of the annular sweep relative to the desired point and adjusting the optical element to be aligned relative to the main axis so that the annular sweep centered about the target associated with said optical element to be aligned.

16. The method of claim 15 further including the step of changing the relative angle of the annular sweep by changing the relative angle of the deflected alignment beam and the main beam.

17. A method of aligning each optical element of the optical cavity of a main laser beam by means of an alignment laser comprising the steps of:
   establishing a target downstream of and associated with the optical element to be aligned;
   aligning the axis of the alignment laser beam relative to a portion of the optical cavity and the optical element to be aligned;
   deflecting the alignment beam from the main beam axis and rotating the deflected beam about the main beam axis in an annular sweep directed towards the optical element to be aligned and centered relative to the associated target;
   sensing the position of the annular sweep relative to the axis of the main beam and the associated target, and adjusting the optical element so that the axis of the main beam passes through the center of the annular sweep being sensed.

18. The method of claim 17 further comprising the steps of: deflecting the alignment beam by means of an apertured reflective surface relative to the main beam so that the axes of each cross, and directing the main beam through the aperture in the apertured reflective surface.

19. An apparatus for aligning laser system optics with a target of said laser system comprising:
   an alignment laser for producing a beam along an optical axis;
   alignment means for orienting the axis of the alignment laser in a selected orientation relative to the axis of the laser system optics;
   deflecting means for deflecting the alignment beam from an initial path of travel;
   rotating means for rotating the deflected alignment beam in an annular sweep at a selected point located relative to the target;
   apertured deflector means aligned for receiving and deflecting the annular sweep of the alignment beam and directing it towards the target, the aperture being aligned with the laser system;
   detector means for detecting the position of the annular sweep relative to the target and producing a corresponding indication thereof; and
   adjusting means responsive to the detector means indication for adjusting the laser system optics relative to the target so that the detection indications are uniform to thereby align the laser system optics with the target.

20. An apparatus for aligning each optical element of a plurality of such optical elements of the optical cavity of a main laser beam with its axis by means of an alignment laser beam comprising:

alignment means for aligning the axis of the alignment laser beam relative to a portion of the axis of the main laser beam;

deflecting means for deflecting the alignment beam off its axis;

at least one target associated with and located downstream of the optical element to be aligned;

rotating means for rotating the deflected alignment beam towards the optical element to be aligned in an annular sweep centered at a point located relative to the associated target;

detector means for the associated target for detecting the position of the annular sweep relative to the optical cavity and axis of the main beam and producing corresponding indications thereof;

adjusting means responsive to the detector means indications for the associated target for adjusting the optical element to be aligned with the main beam relative to the associated target in response to the relative intensity of the annular sweep about the target.

21. The apparatus of claim 20 further including apertured deflector means for deflecting the annular sweep, said apertured deflector being located relative to the main beam to allow the main beam to pass therethrough.

22. The apparatus of claim 21 wherein the alignment beam axis passes through the aperture and the deflecting means includes spaced pairs of opposed spaced mirrors aligned with the alignment beam axes, one mirror of a first pair obliquely located in the alignment beam path for intercepting and deflecting the alignment beam from its initial path and transmitting a portion of the alignment beam to one mirror of the second pair, and the other mirror of each pair located adjacent the alignment beam path for intercepting and further deflecting the alignment beam relative to the alignment axis towards the other pair of mirrors, at least one of each pair of mirrors being mounted for rotation so that the axes remain perpendicular to the main beam axis throughout the annular sweep and the rotating means rotates the opposed pairs of mirrors for producing annular sweeps centered at a point located relative to the respective targets.

23. The apparatus of claim 22 further including:

apertured deflector means aligned for receiving and deflecting the annular sweeps of the alignment beam and directing each towards a desired point located relative to the target, the aperture being aligned so as to allow the main beam to pass therethrough;

the detector means includes plural sets of detectors for detecting the position of each annular sweep relative to the respective desired point and producing the corresponding indication thereof;

an adjusting means responsive to each detector indication for adjusting the optical cavity and main beam relative to the respective targets to pass through the center of the detected annular sweep.

24. The apparatus of claim 23 further including means for correcting deviation of the optical axis due to errors created by the actual thickness of the apertured deflector.

25. The apparatus of claim 1 wherein the deflecting means directs the alignment laser beam across the main laser beam towards the detector means located at a diametrically opposite side of the alignment beam.

26. The apparatus of claim 10 wherein the deflecting means directs the alignment laser beam across the main laser beam towards the detector means located at a diametrically opposite side of the alignment beam.

27. The method of claim 12 wherein deflecting the alignment beam from the main beam axis further includes the step of directing the alignment laser beam across the main laser beam to a diametrically opposite side of the established target.

28. The method of claim 13 wherein deflecting the alignment beam from the main beam axis further includes the step of directing the alignment laser beam across the main laser beam to a diametrically opposite side of the established target.

29. The apparatus of claim 15 wherein the deflecting means directs the alignment laser beam across the main laser beam towards the detector means located at a diametrically opposite side of the alignment beam.

30. The method of claim 17 wherein deflecting the alignment beam from the main beam axis further includes the step of directing the alignment laser beam across the main laser beam to a diametrically opposite side of the established target.

31. The apparatus of claim 20 wherein the deflecting means directs the alignment laser beam across the main laser beam towards the detector means located at a diametrically opposite side of the alignment beam.

* * * * *